United States Patent [19]

Brancher

[11] Patent Number: 5,366,318
[45] Date of Patent: Nov. 22, 1994

[54] SUMP ASSEMBLY

[75] Inventor: Rodney E. Brancher, Media, Pa.

[73] Assignee: Environ Products, Inc., Lionville, Pa.

[21] Appl. No.: 108,537

[22] Filed: Aug. 19, 1993

Related U.S. Application Data

[60] Division of Ser. No. 718,436, Jun. 26, 1991, abandoned, which is a continuation-in-part of Ser. No. 555,210, Jul. 18, 1990, abandoned.

[51] Int. Cl.$^5$ .................................... E03F 5/00
[52] U.S. Cl. ........................... 405/36; 285/363; 405/42; 405/53; 52/20
[58] Field of Search ............... 52/20, 169.6; 405/36, 405/42, 53, 55; 285/363, 405, 158; 220/484, 4.28

[56] References Cited

U.S. PATENT DOCUMENTS

| | | |
|---|---|---|
| 845,760 | 3/1907 | Coffin . |
| 1,317,260 | 9/1919 | Armstrong . |
| 1,793,038 | 3/1928 | Zimmermann . |
| 2,151,770 | 3/1939 | James . |
| 2,254,668 | 9/1941 | Tomek . |
| 2,449,229 | 9/1948 | Hopwood . |
| 2,671,573 | 3/1954 | Hendon . |
| 2,691,538 | 10/1954 | Clausen .................. 285/405 |
| 2,870,881 | 1/1959 | Rogge .................... 285/405 |
| 2,906,500 | 9/1959 | Knapp et al. ........... 405/133 X |
| 3,389,560 | 6/1968 | Zemsky .................. 405/133 X |
| 3,408,778 | 11/1968 | Mason ..................... 52/20 |
| 3,715,958 | 2/1973 | Crawford et al. . |
| 3,859,802 | 1/1975 | Platner et al. .......... 405/153 X |
| 4,230,234 | 10/1980 | Taylor . |
| 4,275,757 | 6/1981 | Singer . |
| 4,552,386 | 11/1985 | Burchette . |
| 4,568,925 | 2/1986 | Butts . |
| 4,621,941 | 11/1986 | Ditcher et al. . |
| 4,685,327 | 8/1987 | Sharp . |
| 4,763,806 | 8/1988 | Podgers et al. . |
| 5,058,633 | 10/1991 | Sharp ..................... 405/55 |
| 5,060,509 | 10/1991 | Webb ..................... 405/54 |
| 5,209,601 | 5/1993 | Odill et al. ............... 52/20 |

FOREIGN PATENT DOCUMENTS

| | | | |
|---|---|---|---|
| 1068961 | 1/1980 | Canada .................... 52/20 |
| 951281 | 10/1956 | Germany ................. 285/363 |
| 3016401 | 2/1981 | Germany ................. 52/20 |
| 51430 | 3/1991 | Japan ....................... 52/20 |
| 424638 | 5/1967 | Switzerland ............. 52/20 |
| 3420 | of 1872 | United Kingdom ..... 285/363 |
| 0667165 | 2/1952 | United Kingdom ..... 220/4.28 |
| 1087178 | 10/1967 | United Kingdom ..... 52/20 |

OTHER PUBLICATIONS

Hofit Publication, pp. A1/17–A17/17 Owens-Corning Publication, pp. 1–9, Dec. 1985.

Primary Examiner—Randolph A. Reese
Assistant Examiner—Heather Chun Shackelford
Attorney, Agent, or Firm—Eugene E. Renz, Jr.

[57] ABSTRACT

The present invention involves a flexible annular member passing through a wall opening. The flexible annular member is positioned about a conduit passing through the wall opening to enable the conduit to pass through the wall at an angle up to and even greater than 30°. Another embodiment of the present invention comprises a flange type riser and base connection involving the location of the entire sealing assembly within a chamber base/riser section.

7 Claims, 10 Drawing Sheets

SUMP ASSEMBLY

This application is a divisional of U.S. application Ser. No. 07/718,436 filed in Jun. 26, 1991, now abandoned. This application is also a continuation-in-part of patent application Ser. No. 07/555,210, filed on Jul. 18, 1990, now abandoned, wherein the entire disclosure of which is incorporated by reference herein.

BACKGROUND OF THE INVENTION—CONTAINMENT SUMPS

Containment sumps are typically found at fuel service stations whereby they are installed below the surface to provide a means of access to the underground piping connections, submersible pumps, leak detection sensors, fire extinguisher and other plumbing components usually found connected to the top of underground storage tanks or under fuel dispensing units. There are generally two types of containment sumps which are similar in purpose but different in design. The first type, is commonly referred to as a "tank sump" which is installed and connected to the top of an underground storage tank. The second type is commonly referred to as a "dispenser sump", which is installed under a fuel dispensing unit.

Containment sumps are multi-purpose in function: 1. They provide a means of surface access to equipment, plumbing and miscellaneous devices, installed underground. 2. They provide a means of ground isolation for contained components to prevent corrosion and decay. 3. They provide a means of secondary containment for those contained components which handle hazardous liquids. 4. They perform as a collection sump for double wall piping entering the sump. Each of these functions will be illustrated and described in detail in this document.

In recent years there has been a national mandate to protect our ground water from hazardous liquid contamination. As a result, there has been federal, state and local legislation created throughout the country requiring stringent regulations on the manner in which hazardous liquids are stored and piped in underground applications. These new regulations require the replacement of leaking underground storage units, storage tanks and associated underground piping. These regulations have also established new design criteria to prevent future tanks and piping from leaking into the environment.

PRIOR SUMPS

Prior to any environmental regulations, there was no concern about installing a tank sump under the street manhole which provided access to the tank and its pump and plumping components. All that was necessary was to provide a barrier to prevent the surrounding backfill materials from entering the area directly below the street manhole. This was typically accomplished by installing a short section of large diameter corrugated pipe that was open at the top and bottom.

When fiberglass underground storage tanks entered the market, some years ago, a problem arose when the unsecured corrugated pipe sections began to damage the top of the tank due to tank and ground movement. It was at this time that there was some attention given to designing a backfill barrier which would not damage the tank. The fiberglass tank manufacturers introduced a flange mounted backfill barrier which was directly connected to the tank. At this time there was no thought to keeping out water or containing leaking product. Therefore, no provisions were made for sealed pipe and conduit entries or keeping out surface water from leaking down through the street manhole.

In recent years these backfill barriers were replaced with environmentally safe tank sumps. These sumps addressed the need of being liquid tight and being made of materials that were corrosion resistant and chemically compatible with the liquid products being stored. The new sumps also featured, enclosed bottoms, pipe and conduit seals, water tight tank adapters which provide connections to the tank. The tank adapters' two piece construction allowed for easier installation in deep tank burials. These new tank sumps were far from being a good design, they experienced leaking pipe and conduit entry seals, and were difficult to install. Many of these sumps have collapsed due to external backfill and high groundwater pressure because of their structural design. Most of these sumps are made of rotationally molded polyethylene or glass reinforced plastic (fiberglass), both being a non-corrosive material.

DISPENSER SUMPS

With the introduction, of a new environmentally safe tank sump, has come the development of a new type of sump called the "dispenser sump". The sumps are of a different design but serve a similar purpose. They are installed under the fuel dispenser to provide a means of secondary containment for the dispenser plumbing and the underground piping connections located directly below the dispenser. These dispenser sumps are available in both shallow and deep versions.

Subterranean piping systems, which are typically found at service stations, connect the remote underground storage tank to one or more above ground fuel dispensing units. At each of these connection locations are found access enclosures which provides surface access to these piping connections and other equipment such as a tanks' pump, valves and other plumbing devices.

The underground storage and fuel dispensing system has been determined to be a source of environmental pollution, as well as a safety hazard because of product leakage into the surrounding earth. All components of that storage and dispensing system should be designed in such a manner that they prevent any leakage into the environment. Access enclosures located at the tank and under the dispensing unit provide a means of secondary containment for part of the entire system.

These access enclosures should be of such a design that they are liquid tight preventing ground and surface water from entering the enclosure, and containing leaking product from escaping the enclosure into the surrounding environment. They should also be made of a material which is resistant to corrosion and deterioration, They shall be of sufficient strength to withstand external pressure from surface loads, backfill pressure, and high ground water pressures. They shall also be designed and installed so that they flex or shift in such a manner that they do not damage the top of the tank as a result of tank, ground or surface movement. They should provide a means of effectively sealing all conduit and pipe penetrations into the sump. They shall provide a mean for liquid tight and secure connections to the tank and dispensing island.

PRIOR SEALING PRODUCTS

There are a number of products available which provide a means of effectively sealing all conduit and pipe penetrations into the sump. These products meet many of the above design requirements but for one reason or the other are deficient.

One of the areas in which these sumps are deficient is in the manner in which they deal with pipe and conduit entries into the sump. The nature of the problem is that pipe and conduit do not always enter or exit the sump in a head on direction. Because of the congested plumbing configurations inside the sump the exit direction of the pipe or conduit is many times at an angle in relation to the sump wall. Angled entries and exits present a difficult installation problem and often make it impossible to achieve a liquid tight seal using conventional pipe and conduit seals.

Different manufacturers offer a variety of seals and sump configurations which address pipe and conduit penetration. The most popular type of seal being used is a rubber grommet which is available in a variety of pipe and conduit sizes. This allows a hole to be drilled in any desired location of the sump wall accommodating a pipe or conduit. The effectiveness of this product depends on a clean and even hole being drilled in the sump wall and the pipe or conduit entering and exiting the sump in a head on direction. Many of the sumps that are leaking today are fitted with these type of seals. Once installed and buried it is virtually impossible to fix a leaking grommet.

Another manner of sealing pipe and conduit entries is to provide integral molded cuffs in the sump located in fixed locations on the sump wall. These cuffs generally face inward so that they are accessible after burial. The problem with this type of design is that they fix the location of all pipe and conduit entries or exits. This means the external pipe and conduit routing layout must be exact, and the internal plumbing configurations inside the sump must be designed in such a manner that the pipe and conduit exit at these fixed locations. These internal cuffs are rigid and therefore do not allow for angled pipe and conduit exits. Another problem with these fixed internal cuffs is that they must be very large in diameter to accommodate a variety of pipe and conduit diameters. There are three types of internals cuffs available on different types of tank sumps. The first type of cuff is available on fiberglass sumps and are designed to be sealed to fiberglass piping by means of applying a thermoset resin and glass matting. The second type of cuff is available on rotationally molded polyethylene sumps are designed to seal the pipe or conduit by means of a rubber seal and band clamp. The third type of cuff is available on steel sumps and use a rubber reducer boot to seal from the outside of the cuff down to the outside of the pipe or conduit.

Another area of the sump which has caused some concern in the past is the sump cover which is designed to keep surface water draining down from around the street manhole and getting into the sump. Most sumps do an effective job in shedding this dripping water from above but are not effective in a wet hole application where there is high ground water that can seep into the sump from below.

OBJECTS OF THE INVENTION

In view of the foregoing it is an object of the present invention to provide a flexible pipe entry seal arrangement that will enable the passage of a conduit or pipe through a wall opening, either perpendicular to the wall opening or at an acute angle of up to 15° or more with respect to the wall opening;

Yet another object of the present invention is to provide a flange type riser and base connection which enables the establishment of a fluid-tight arrangement between a chamber base and a riser section that results in a completely fluid tight, mechanical seal that is located completely inside and not outside; does not need to be welded and is accessible after installation;

The foregoing as well as other objects of the invention are achieved as will be set forth below.

BRIEF DESCRIPTION OF THE FLEXIBLE PIPE ENTRY INVENTION

The flexible pipe entry seal arrangement of the present invention involves the combination of a conduit passing through an opening in a wall having an outer and inner surface. The invention comprises flexible annular means positioned about the conduit for a substantial length of the conduit, the flexible annular means being made of a flexible corrosion resistant material and having a conduit engaging section. The invention further comprises flange means engaging an outer surface of the wall and bolt means associated with the flange means to hold the flexible annular means in position in engagement with the wall opening, wherein the wall opening is wider than the conduit whereby the conduit may pass through the wall opening at a position other than perpendicular to the wall, of up to a 30° angle or more with respect to the wall.

DESCRIPTION OF THE DRAWINGS

Reference is now made to the various figures of the drawing wherein like reference characters refer to like parts.

Figure 1:
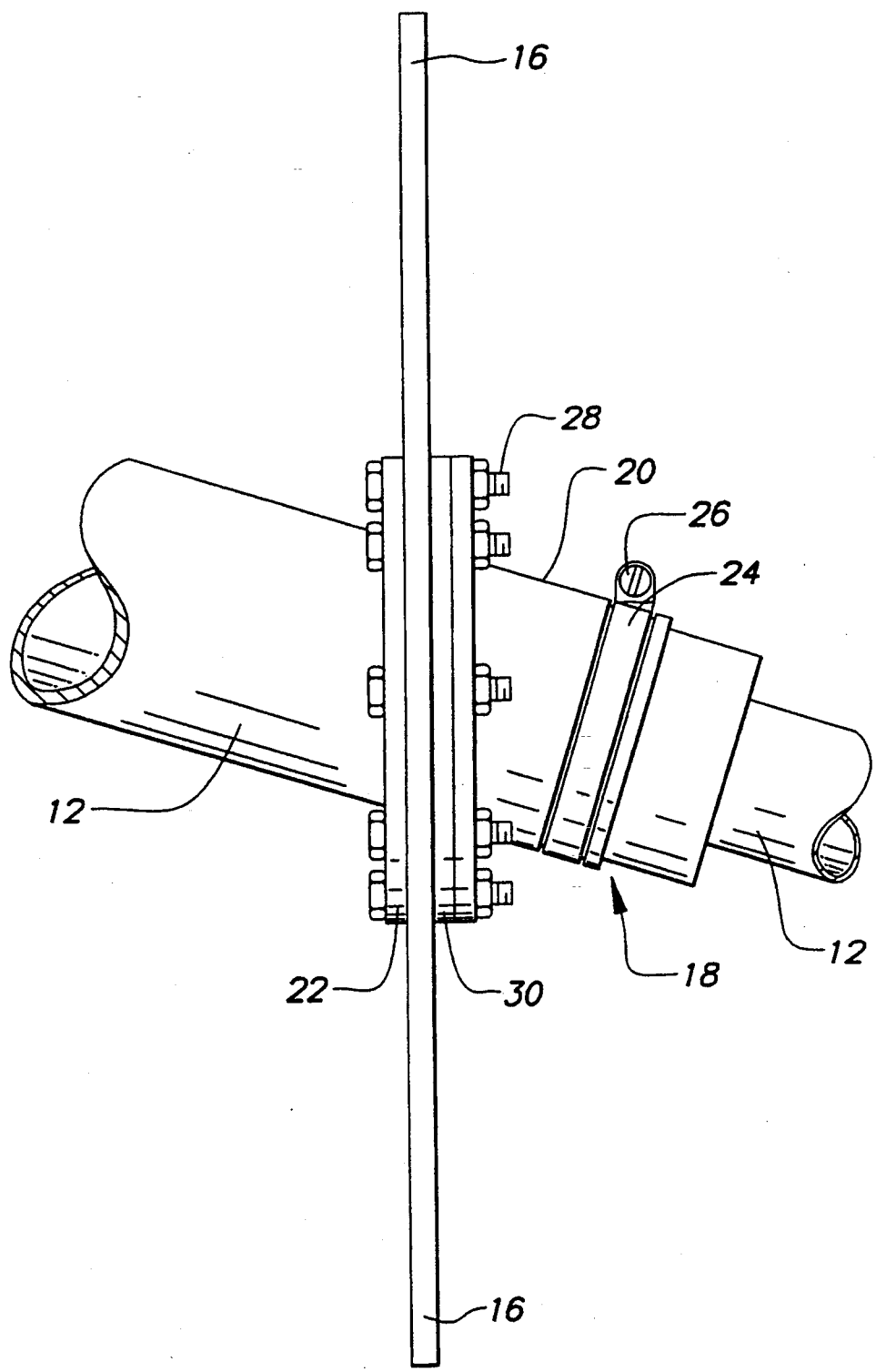
FIG. 1 is an elevational view showing a conduit (pipe) which can pass through a wall at an angle up to and even greater than 30° and wherein a flexible pipe entry seal arrangement is being utilized.

Referring now to the various figures of the drawing wherein like reference characters refer to like parts, there is generally shown in FIG. 1, an embodiment of the flexible pipe entry seal arrangement of the present invention wherein the conduit or pipe 12 passes through an opening 14 (FIG. 2) in a chamber wall 16 at approximately a 30° angle with respect to the wall.

Figure 2:
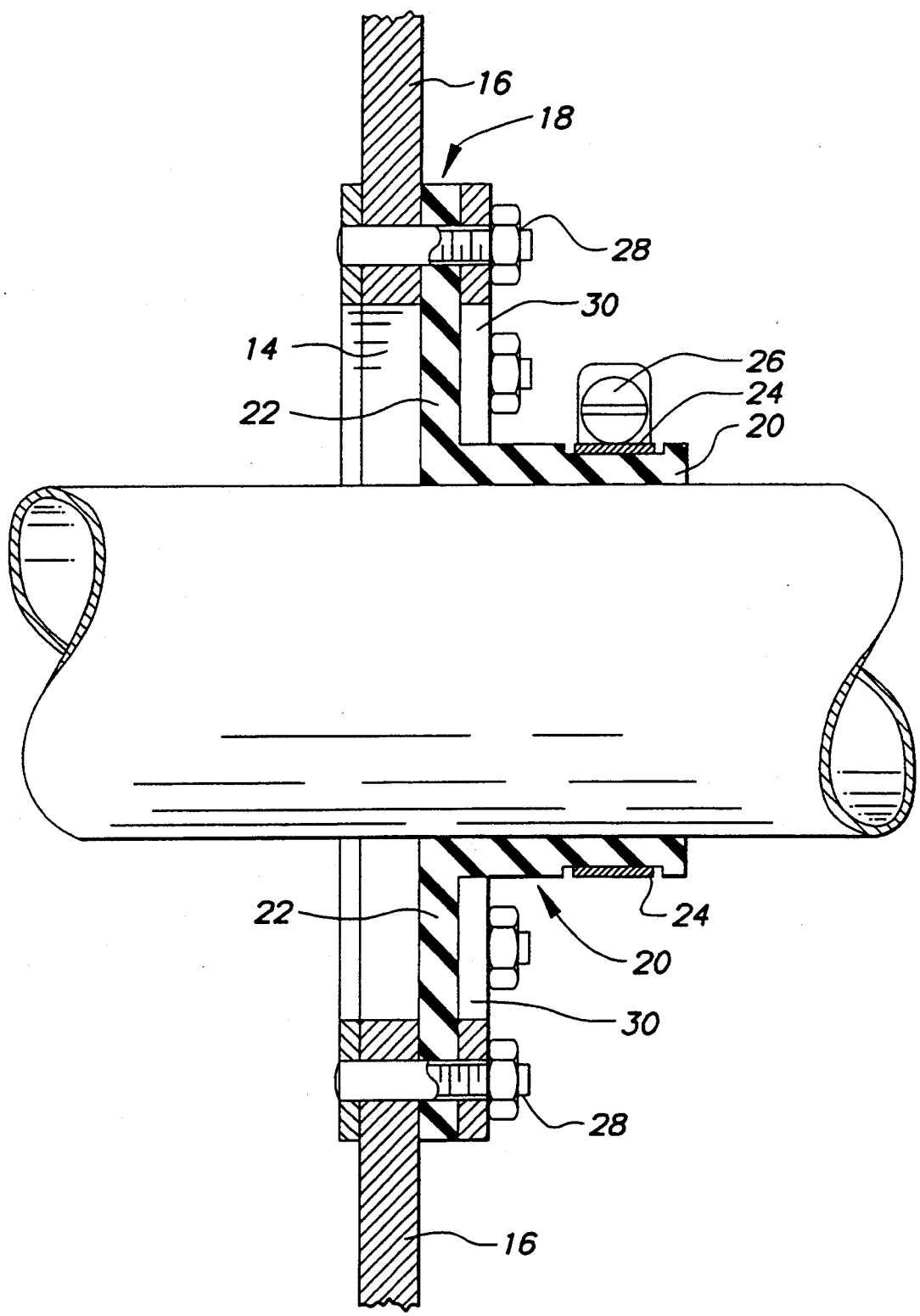
FIG. 2 is sectional view showing significant internal parts including the flexible pipe entry seal arrangement.
Figure 3:
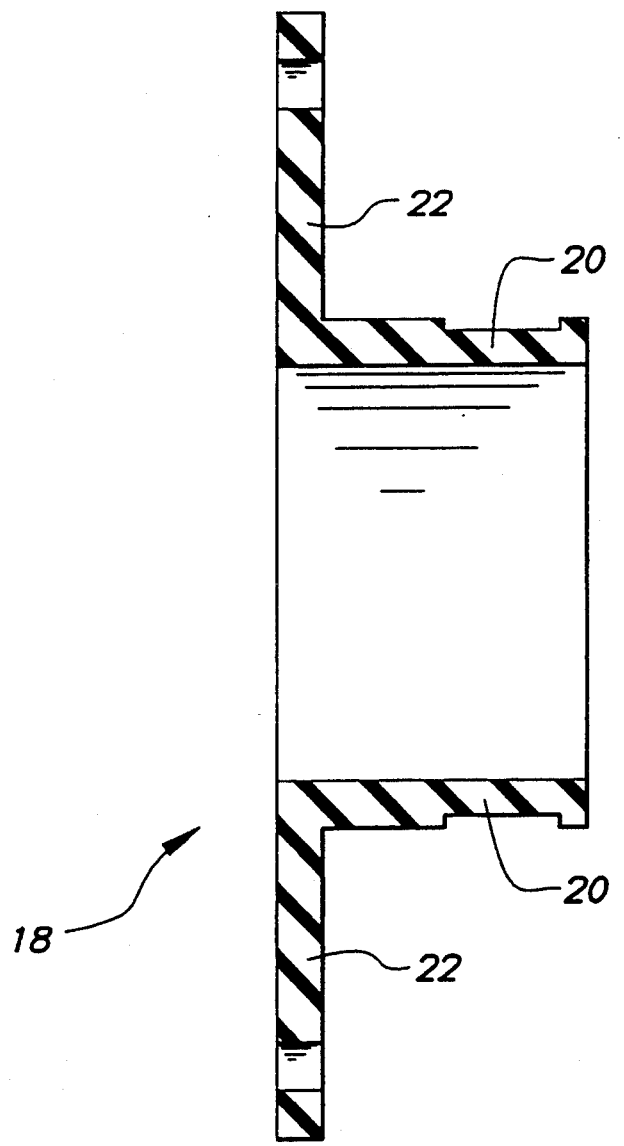
FIG. 3 is an enlarged sectioned view of the flexible pipe entry seal arrangement.

The flexible pipe entry seal invention is shown in more detail in FIG. 2. The pipe 12 is fixed with the flexible annular member 18, which as shown in FIG. 3, comprises a pipe engaging section 20 and an outer positioned flange 22 which is preferably coated with an epoxy or other corrosion resistant material. It is preferred that the flexible annular member 18 be comprised of a corrosion resistant compressible material such as a Buna-N rubber.

As shown in FIG. 3, the pipe engaging section 20 has an internal diameter in the preferred embodiment of 2.375 inches. This permits the pipe engaging section 20 to fit relatively loosely about the outer surface of a typical two inch pipe 12.

A band clamp 24 (FIG. 2) with tightening nut 26 is provided to secure the annular member 18 about the pipe 12. The tightening bolt has a threaded stem (not shown) which engages a threaded hole in an associated tab which has the effect of tightening or compressing the exterior of the pipe engaging section 20 of the annular member 18 tightly against the outer surface of the pipe 12.

As further shown in FIG. 2 the flange 22 is tightly secured against the chamber wall 16 by means of a series of nuts and bolts 28 (two shown). Also, the nuts and bolts 28 are provided in order to secure a compression ring 30 to both the flange 22 and then to the chamber wall 16 and a further studded flange as shown in FIG. 2.

Figure 4A:
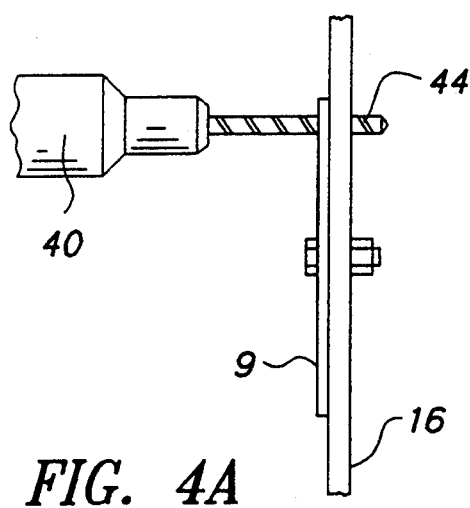
FIGS. 4a–4f contain six views showing basic installation instructions for the flexible pipe entry seal arrangement.

The installation of the flexible pipe entry seal arrangement of the present invention is further shown and described in FIGS. 4A–F. As shown in FIG. 4A, a drill 40 or other device is used with a preferably disc-like template 9, having a 3/16" or ¼" central guide hole (not shown) and the proper number and size holes around its circumference which correspond to the number and size of the nuts and bolts 28 to be used to secure the flexible pipe entry seal to the wall 16.

The template 9 is placed on the wall 16 as a guide to create the appropriately size and number of openings. The central guide hole of the template 9 is placed approximately at the center of the opening 14 (FIG. 4E) through which the pipe will eventually pass. The drill 40 is then used to create a pilot hole (not shown) through the wall 16, by drilling through the hole (not shown) in the template 9. After the pilot hole is created, the template 9 is temporarily secured to the wall 16 by use of a typical nut and bolt. Thereafter, as shown in FIG. 4A, the first hole 8 is drilled into the wall 16 by drill 40. After the first hole 8 is drilled, it is preferred that a bolt (not shown) be temporarily placed therethrough to prevent rotation of the disc template 9 while the other holes are drilled. After the remaining number of holes to be drilled are complete, the template 9 and associated temporary nuts and bolts may be removed from the wall 16.

Figure 4B:
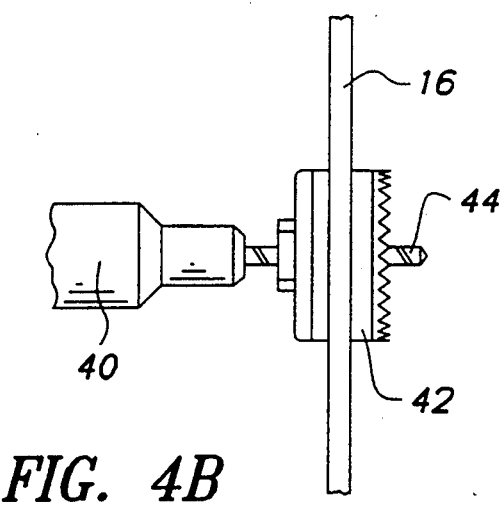

As shown in FIG. 4B, a hole is cut or drilled in the wall 16, for example, in one embodiment, a hole having a 4.5 inch diameter. It should be readily apparent to those skilled in the art that the proper sized hole depends upon the diameter of the proposed conduit and the proper sized annular member 18.

Although the conduit passage hole may be made in any suitable fashion, it is preferred that the drill bit 44 be secured to the drill 40 having a conventional hole saw 42 also attached thereto. Thereafter, by placing the drill bit 44 through the previously created pilot hole (not shown), the larger hole created by the hole saw 42 will be properly positioned on the wall 16.

Figure 4C:
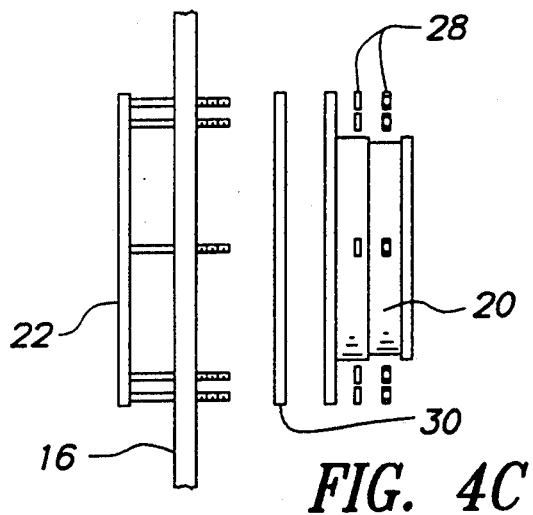
Figure 4D:
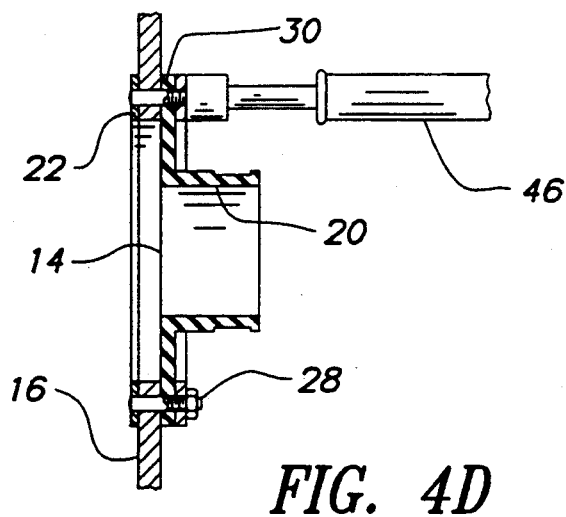
Figure 4E:
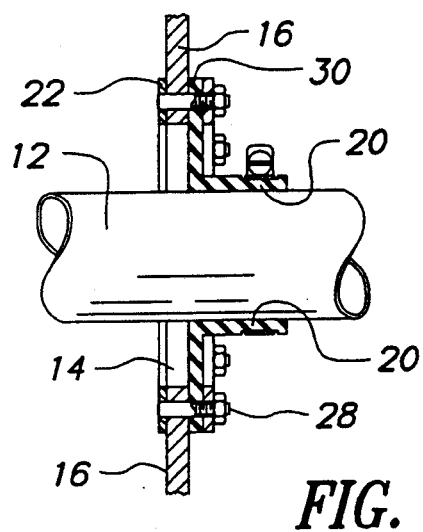
Figure 4F:
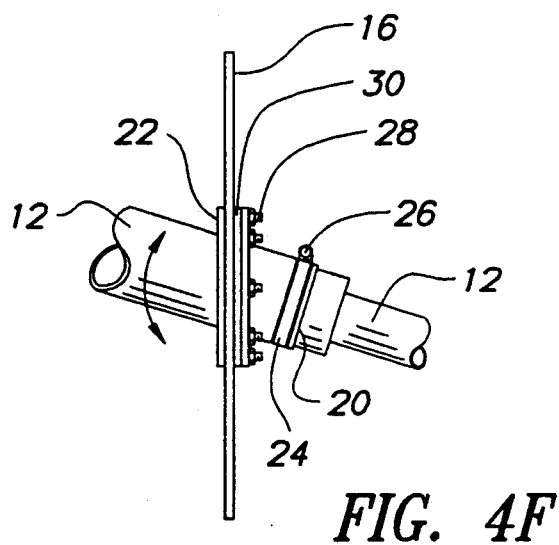
Figure 5:
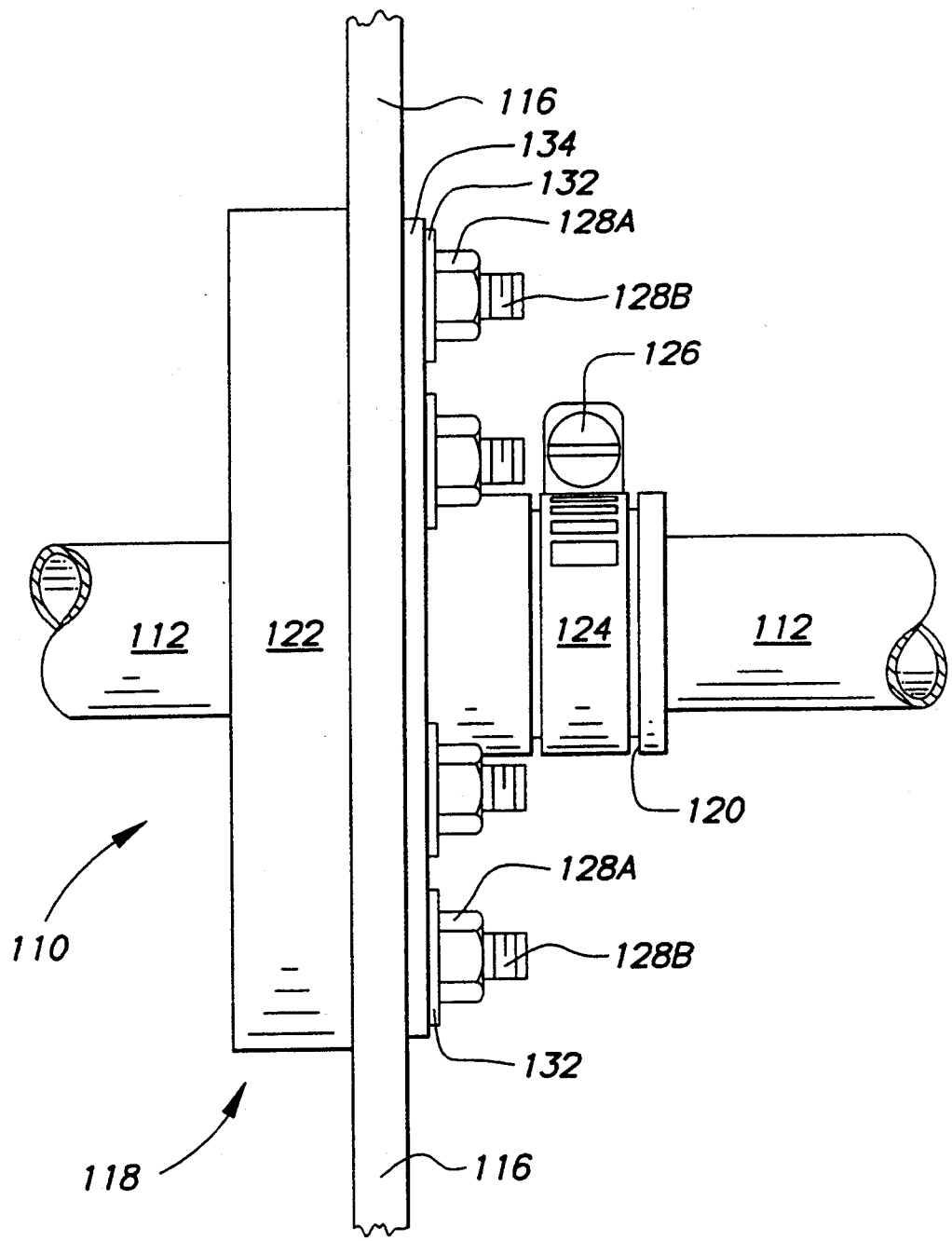
FIG. 5 is an elevational view showing a conduit (pipe) which can pass through a wall at an angle up to and even greater than 30° and wherein a flexible pipe entry seal arrangement is being utilized.

As shown in FIG. 4C, after the opening 14 is cut in the chamber wall 16, the flange 22 and threaded members are placed on the outside of the wall 16 and passed through appropriate openings created as shown in FIG. 4A. On the inside of the sump wall 16 is placed compression ring 30 with complimentary openings (not shown) to those created by the template 9 and there are similar complimentary openings in the flange 22 (not shown). The openings (not shown) of the annular member 18 are then placed about the corresponding threaded members. The entire assembly is tightened as shown in FIGS. 4D–F using conventional nuts and bolts 28 and washers, which in the preferred embodiment are comprised of a corrosion resistant material.

Thus, the angle of entry of the conduit or pipe 112 can be varied up to 30° or more depending upon the dimensions of the opening 14 in the chamber wall 16, the size of the annular member 18 and the size of the conduit 12.

The second preferred embodiment of the flexible pipe entry seal arrangement 110 of the present invention is shown in FIGS. 5–8. This device may be installed over flat, curved or irregular wall surfaces due to its construction.

A method of installing the second embodiment 110 is shown in detail in FIGS. 8A–F, to be described in detail below.

Figure 6:
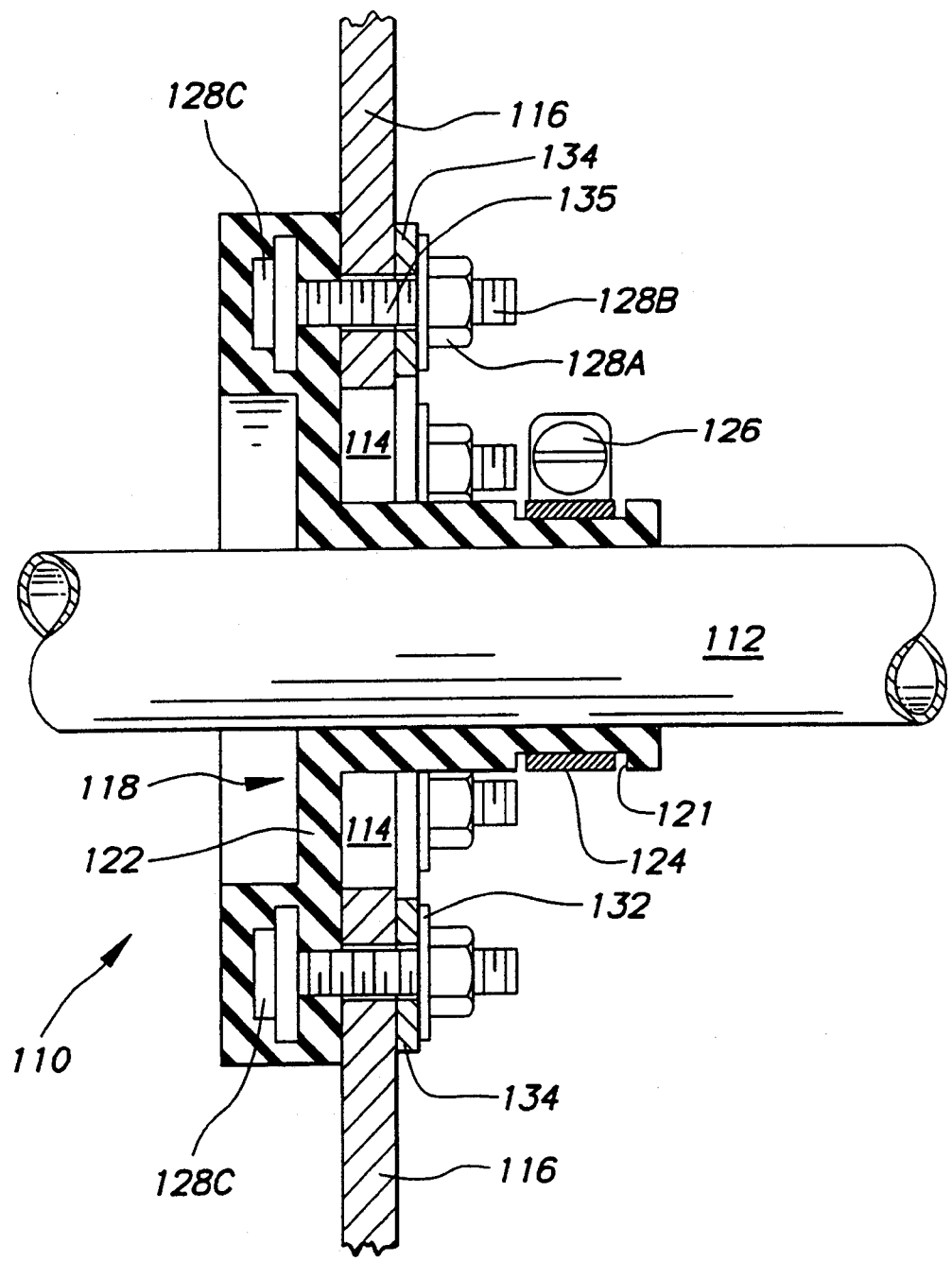
FIG. 6 is a sectional view of FIG. 5 showing significant internal parts including the flexible pipe entry seal arrangement.

As shown in FIG. 6, the device 110 is utilized to connect a conduit 112 or pipe through an opening 114 in a wall 116 such as a sump chamber wall. This device 110 prevents or minimizes the leakage of any fluid or other materials from one side of the wall to the other as a result of the opening therethrough, e.g., from a chamber (not shown) to the exterior thereof while permitting the conduit 112 to pass through the opening 114 at an angle of from zero to thirty degrees or more.

As described in further detail below, the device 110 basically comprises an flexible annular member 118 formed of a generally flexible material such as Buna-N rubber and means for securing the flexible annular member 118 to the wall. The flexible annular member 118 comprises a pipe engaging section 20 through which the pipe or conduit 112 passes and a flange 122, the annular member 118 being secured to the wall 116 so that the flange 122 is positioned on the interior surface of the wall 116 and the pipe engaging section 20 extends through the wall 116 to its exterior surface.

As shown in FIG. 6, the flexible annular member 118 is positioned within the opening 114 of sump wall 116 with the pipe 112 therethrough and the annular member 118 being secured to the sump wall 116 by at least, and preferably six or eight, conventional, preferably corrosion resistant nuts 128A and bolts 128B. The pipe engaging section 120 of the annular member 118 permits the pipe 112 to pass therethrough and yet provides flexibility in the angle at which the pipe 112 may pass through the opening 114 of the wall 116.

Additionally, the device 110 comprises an internal compression ring or collar 134, described in detail below, which aids in fixedly securing the annular member 118 to the sump inner wall 116 and minimizes any potential leakage by applying and dispersing the pressure produced by the nuts 28A and bolts 28B, alone or in combination with the washers 132.

Figure 7:
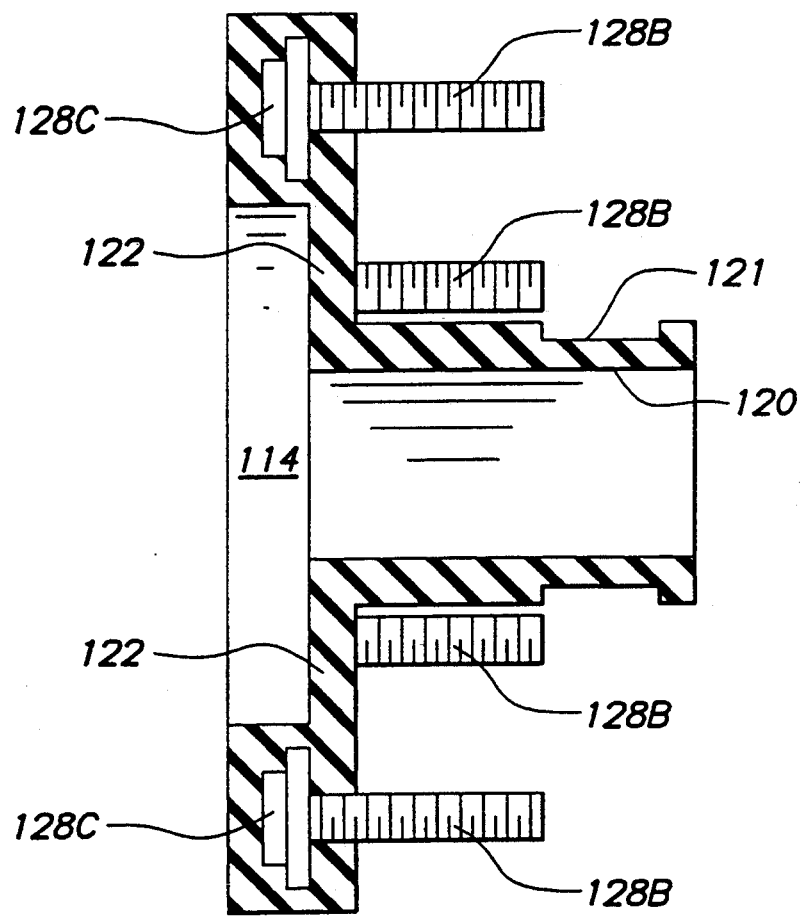
FIG. 7 is an enlarged sectional view of the flexible pipe entry seal arrangement of FIG. 5.

As seen in FIG. 7, the diameter of the opening 114 is larger than the diameter of the pipe 112 to provide the flexibility, when necessary, for the pipe 112 to enter the opening 114 at an angle, while still maintaining a seal to prevent the leakage of fluids or other materials due to the opening 114. In the second embodiment, the angle shown is less than 30°, however any reasonable angle even in excess of 30° may utilized as shown in FIG. 8F.

As shown in FIG. 6, the pipe engaging section 120 is secured about the pipe 120 by use of the band clamp 124 contained within channel 121. The clamp 124 may be tightened by tightening nut 126 with a conventional screw driver (not shown).

As shown in FIG. 7, each of the bolts 128B has a threaded portion terminating at a head 128C, which is preferably completely contained within the flange 122 of the annular member 18 to minimize or eliminate any corrosive effects upon the bolt head 128C. It should be readily apparent to those skilled in the art that, if desired, the bolt heads 28C need not be contained within the flange 122.

As shown in FIGS. 8A–F, the device 110 is preferably installed in the following manner, although any suitable manner of installation is possible.

Figure 8A:
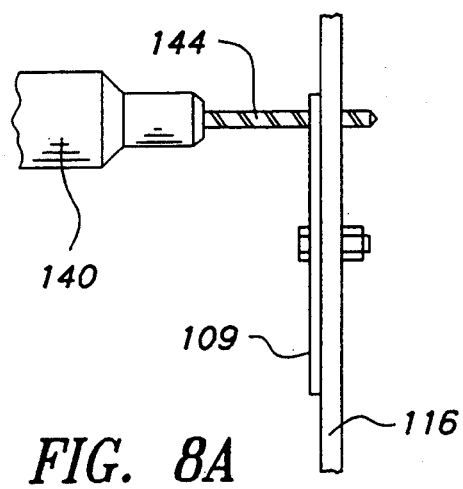
FIGS. 8a–8f contains six views showing basic installation instructions for the flexible pipe entry seal arrangement.

As shown in FIG. 8A, a disc-shaped template 109 is placed against the wall 116 to assist the installer in making the appropriate holes. In order to facilitate this process, the template 109 has a central pilot hole (not shown) which is approximately 3/16-¼" in diameter. The template 109 also contains a series of circumferential holes (not shown) which correspond in size and number to the bolts 128B (FIG. 8C) which will secure the annular member 118 to the wall 116. The template 109 is positioned on the wall 116 so that the central pilot hole (not shown) will be approximately at the center of the opening 114 (FIG. 6) to be made in the wall 116, as described below.

As shown further in FIG. 8A, once the template 109 is properly positioned, a drill bit 144 is attached to the drill 140, preferably making a ¼ inch hole in the wall 116, through the central pilot hole of the template. After the pilot hole (not shown) is created in the wall 116, the template 109 may be temporarily secured to the wall 116 by a conventional nut and bolt arrangement 135. After the template 109 is secured, the template 109 may be used to create the pattern of holes (not shown) in the wall 116 through which the bolts 128B (FIG. 8C) will eventually pass. It should be readily apparent to those skilled in the art that the pattern of holes appearing on the template 109 is dependent upon the size and number of holes used to secure the annular member 118 to the wall 116.

To optimize the positioning of these holes, after the first hole is created using the template 109, one may temporarily place a nut and bolt therethrough (not shown) to prevent any slight movement or rotation of the template 109 as each successive hole is made. After completing the proper number of holes, the template and associated temporary nuts and bolts are removed.

Figure 8B:
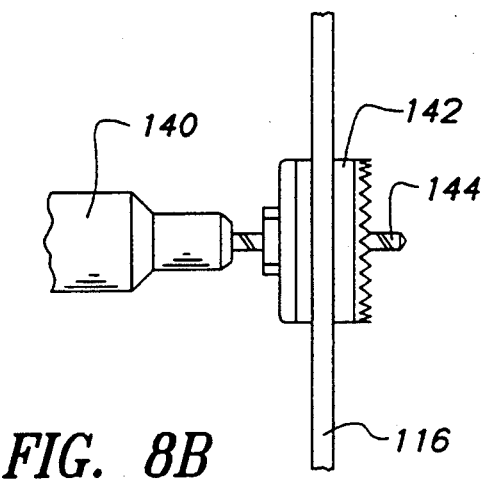

As shown in FIG. 8B, a conventional hole saw attachment 142 is secured to the drill 140 having the drill bit 144 of Fig. 4A attached thereto. The drill bit 144 is positioned in the previously created central pilot hole (not shown) in the wall 116 to aid in positioning the hole saw attachment 142. The hole saw 142 then creates the appropriate hole 114 (FIG. 6). For example, a two inch diameter hole saw is utilized for conduit entries and a 5¼" diameter hole saw may be used for a pipe entry, although any suitable size may be utilized depending upon the circumstances of use.

Figure 8C:
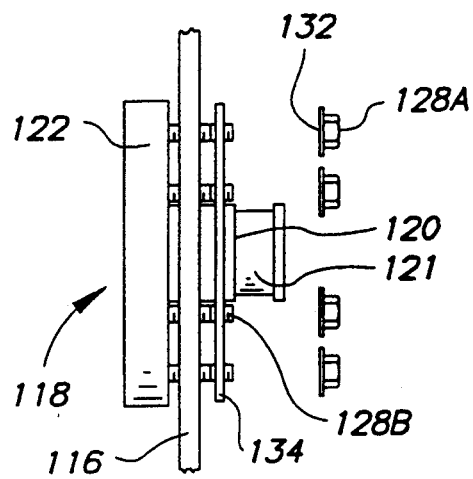

As shown in FIG. 8C, the annular member 118 with the bolts 28B having the heads contained within the flange 122, is positioned so that the bolts 128B pass through the proper holes 135. An internal compression ring 134 is then positioned on the side of the sump wall 116 as shown in FIG. 8C. In the preferred embodiment, the compression ring 134 is comprised of a rigid, non-deformable material such as steel. The corresponding washers 132 (when utilized) and the nuts 128A are thereafter loosely installed on each of the bolts 128B. The compression ring 134 is positioned opposite the flange 122 of the annular member 118 and aids in sealingly securing the annular member 118 to the wall 116 and in dispersing the pressure exerted by the bolts 128B and nuts 128A over a greater surface area by maximizing the surface contact between the compression ring 134 and the wall 116.

Figure 8D:
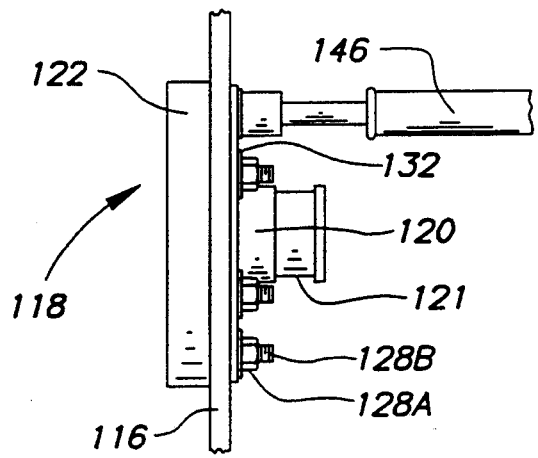

As shown in FIG. 8D, after all of the nuts 128A have been loosely threaded onto the bolts 128B, each bolt is appropriately tightened. Although any conventional method of tightening may be used, it is preferred that a torque wrench be utilized so that each nut is tightened to about 60 inch pounds. Excessive tightening of the nuts 128A may deform the annular member 118.

Figure 8E:
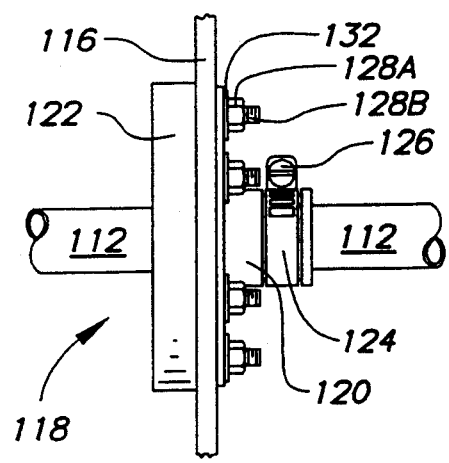
Figure 8F:
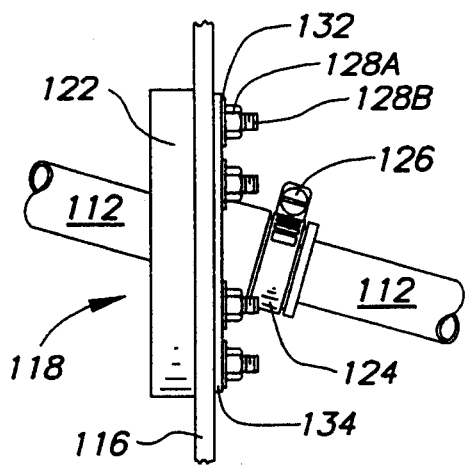

As shown in FIG. 8E, the appropriate sized pipe 112 or conduit is inserted into the pipe engaging portion 120 of the annular member 118. The band clamp 126 is installed about the channel 121 of the portion 120 and is secured thereabout by tightening of nut 126. As shown further in FIG. 8F, the annular member 118 is flexible enough to permit angle pipe or conduit entries of zero to thirty degrees or more in relation to the wall 116.

Figure 9:
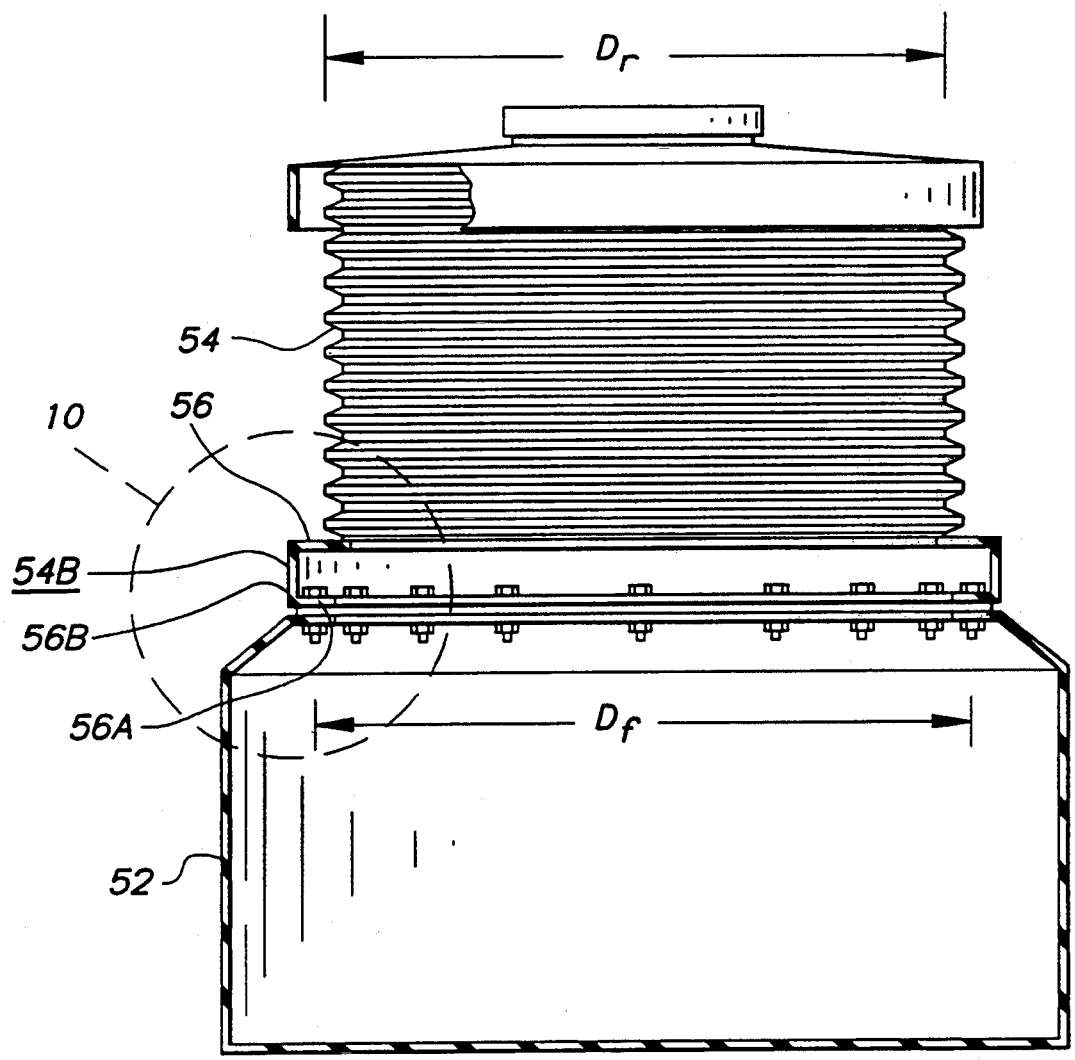
FIG. 9 is an elevational view with portions broken away to show the flange type riser and base connection and the riser and cover seal using a rib riser with O-ring.
Figure 10:
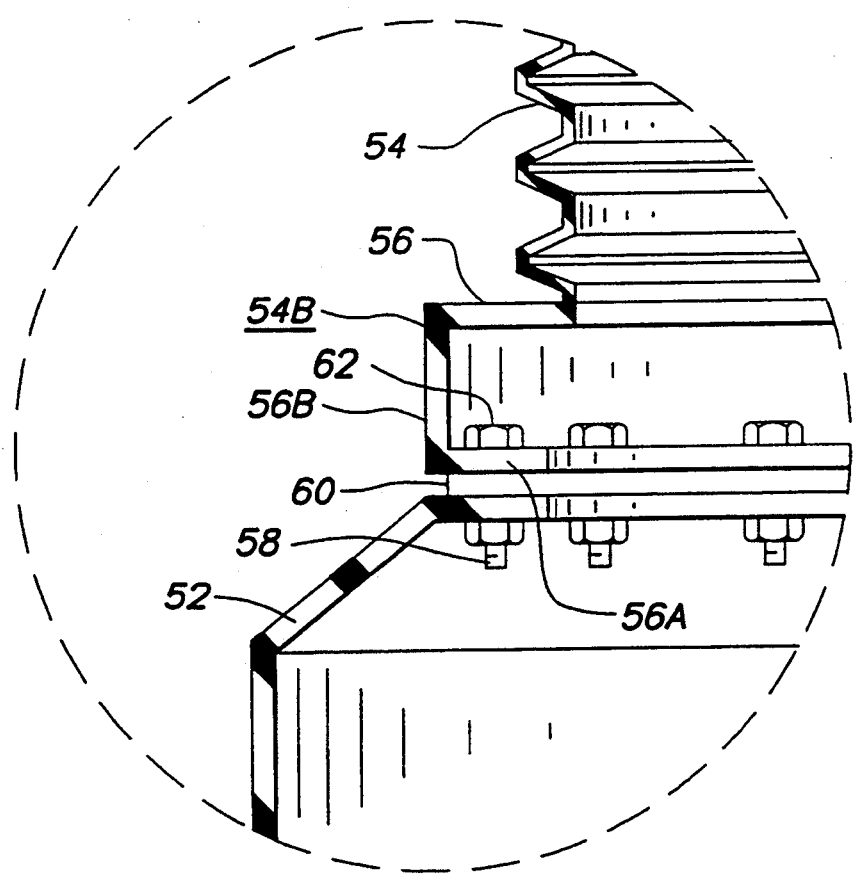
FIG. 10 is a view related to FIG. 9.

Reference is now made to the flange type riser and base connection invention as shown particularly in FIGS. 9 and 10 (upper figure). This invention relates particularly to a nonwater tight manhole and may also be referred to as a flange type riser and base connection or base seal joint.

FIG. 9 shows a tank sump having a chamber base 52. There are also upwardly extending ribbed riser 54, preferably made of a polyethylene plastic. The ribbed riser or riser section extends above the chamber base. The present invention relates to the flange connection between the riser section and the chamber base.

As shown in both FIGS. 9 and 10 the riser section 54 has a first flange 56 and the chamber base 52 has a second flange 58. An O-ring 60 is positioned between the two flanges 56 and 58. Fasteners 62 extend from the space below the lower edge of the riser and into the chamber base. A nut 64 is provided to make the assembly fast.

As illustrated in the drawings, the bolt hole circle for the fasteners 62 is of a generally greater diameter $D_f$ than the diameter $D_r$ of the tubular riser section. Further, the tubular riser section has a step portion 54B of generally U-shaped cross section at its lower terminal end comprising as illustrated axially spaced first and second riser flanges 56 and 56A connected by an axial wall 56B.

As shown in FIG. 9 there are at least nine such fasteners. Also, the assembly does not have to be welded and is accessible after installation.

The fasteners 62 which extend into the chamber base are relied upon to secure the flanges 56 and 58 and the O-ring 60 in a fluid-tight arrangement. Thus, the entire sealing assembly is located within the chamber base/- riser section. The net result is to achieve fluid-tight arrangement involving a completely mechanical seal that is located completely inside and not outside. Stated another way the fasteners 62 do not pass from the outside to the inside. This avoids the possibility of unwanted leaks.

Without further elaboration, the foregoing will so fully illustrate my invention that others may, by applying future knowledge, adopt the same for use under various conditions of service.

We claim:

1. A sump assembly comprising:
   a hollow base having a bottom wall, an upstanding side wall and a circumferentially extending radially inwardly directed flange extending from the upper edge of the base;
   an elongated generally tubular riser section having a circumferentially extending radially inwardly directed flange at its lower terminal edge confronting and overlying the base flange;
   a cover mounted over the open upper end of the riser;
   seal means disposed between the confronting faces of the riser and base flanges; and
   a plurality of circumferentially spaced fasteners for securing the riser flange and base flange together with the seal means interposed therebetween, said fasteners engaging through holes located on a circle generally greater in diameter than that of the tubular riser section.

2. A sump assembly as claimed in claim 1 wherein said seal means comprises an O-ring having a circumferentially extending sealing surface located radially outboard of the circumferentially spaced fasteners.

3. A sump assembly comprising:
   a hollow base having an upstanding side wall and a circumferentially extending radially inwardly directed flange extending from the upper edge of the base;
   an elongated generally tubular riser section having an outwardly directed step portion at its lower terminal end including at least one generally radial riser flange;
   seal means disposed between the confronting faces of the riser and base flanges; and
   a plurality of circumferentially spaced fasteners for securing the riser flange and base flange together with the seal means interposed therebetween whereby said fasteners are disposed interiorly of the riser and base and at least partially within the step portion of the riser.

4. A sump assembly comprising:
   a hollow base having an upstanding side wall and a circumferentially extending radially inwardly directed flange extending from the upper edge of the base;
   an elongated generally tubular riser section having an outwardly directed step portion at its lower end including a pair of axially spaced first and second generally radially extending riser flanges connected by an axial wall;
   seal means disposed between the confronting faces of one of the riser and base flanges; and
   a plurality of circumferentially spaced fasteners for securing said one riser flange and base flange together with the seal means interposed therebetween whereby said fasteners are disposed interiorly of the riser and base and at least partially within the step portion of the riser.

5. A sump assembly comprising:
   a hollow base having an upstanding side wall and a circumferentially extending radially inwardly directed flange extending from the upper edge of the base;
   an elongated generally tubular riser section having an outwardly directed step portion at its lower terminal end of generally U-shaped cross section including at least one generally radially extending riser flange;
   seal means disposed between the confronting faces of the riser and base flanges; and
   a plurality of circumferentially spaced fasteners for securing the riser flange and base flange together with the seal means interposed therebetween whereby said fasteners are disposed interiorly of the riser and base and at least partially within the step portion of the riser.

6. A sump assembly comprising:
   a hollow base having an upstanding side wall and a circumferentially extending radially inwardly directed flange extending from the upper edge of the base;
   an elongated generally tubular riser section having an outwardly directed step portion at its lower terminal end including at least one generally radial riser flange;
   seal means disposed between the confronting faces of the riser and base flanges; and
   a plurality of circumferentially spaced fasteners for securing the riser flange and base flange together with the seal means interposed therebetween, said fasteners engaging through holes located on a circle generally greater in diameter than that of the tubular riser section.

7. A sump assembly comprising:
   a hollow base having an upstanding side wall and a circumferentially extending radially inwardly directed flange extending from the upper edge of the base;
   an elongated generally tubular riser section having an outwardly directed step portion at its lower terminal end including at least one generally radial riser flange;
   seal means disposed between the confronting faces of the riser and base flanges; and
   a plurality of circumferentially spaced fasteners for securing the riser flange and base flange together with the seal means interposed therebetween permitting assembly of the fasteners interiorly of the base and riser so that they are sealed from the ambient environment outside the sump riser, said fasteners disposed at least partially within the step portion of the riser.

* * * * *

Disclaimer and Dedication

5,366,318—Rodney E. Brancher, Media, Pa. SUMP ASSEMBLY. Patent dated Nov. 22, 1994. Disclaimer and Dedication filed Aug. 18, 1997, by the assignee, Environ Products, Inc.

Hereby disclaims and dedicates to the Public the remaining term of said patent.
*(Official Gazette,* January 13, 1998)

UNITED STATES PATENT AND TRADEMARK OFFICE
CERTIFICATE OF CORRECTION

PATENT NO. : 5,366,318
DATED : November 22, 1994
INVENTOR(S) : Rodney E. Brancher It is certified that error appears in the above-identified patent and that said Letters Patent is hereby corrected as shown below:

Column 2, line 58; change "tion, They" to --tion. They--.

Column 7, line 17; change "member 18" to --member 118--.

Signed and Sealed this

Thirty-first Day of March, 1998

Attest:

BRUCE LEHMAN

*Attesting Officer*       *Commissioner of Patents and Trademarks*

REEXAMINATION CERTIFICATE (3459th)
United States Patent
Brancher

[11] B1 5,366,318
[45] Certificate Issued  *Mar. 10, 1998

[54] SUMP ASSEMBLY

[75] Inventor: Rodney E. Brancher, Media, Pa.

[73] Assignee: Environ Products, Inc., Lionville, Pa.

Reexamination Request:
No. 90/004,537, Feb. 3, 1997

Reexamination Certificate for:
Patent No.: 5,366,318
Issued: Nov. 22, 1994
Appl. No.: 108,537
Filed: Aug. 19, 1993

[*] Notice: The portion of the term of this patent subsequent to Aug. 18, 1997, has been disclaimed.

Related U.S. Application Data

[60] Division of Ser. No. 718,436, Jun. 26, 1991, abandoned, which is a continuation-in-part of Ser. No. 555,210, Jul. 18, 1990, abandoned.

[51] Int. Cl.$^6$ .................................................. E03F 5/00
[52] U.S. Cl. .................. 405/36; 285/363; 405/42; 405/53; 52/20

[56] References Cited

U.S. PATENT DOCUMENTS

| | | | |
|---|---|---|---|
| 2,671,573 | 3/1954 | Hendon et al. | 220/5 |
| 4,076,040 | 2/1978 | Alpers et al. | 137/371 |
| 4,709,723 | 12/1987 | Sidaway et al. | 137/584 |
| 5,040,408 | 8/1991 | Webb | 73/40.5 R |
| 5,060,509 | 10/1991 | Webb | 73/40.5 R |

OTHER PUBLICATIONS

"Total Containment Sump/Risers Installation Instructions", Publication No. SRP-202, Apr. 15, 1989.
Total Containment publication entitled "Jacketed Steel Tanks Product Manual", Feb. 1, 1989.

*Primary Examiner*—Dennis L. Taylor

[57] ABSTRACT

The present invention involves a flexible annular member passing through a wall opening. The flexible annular member is positioned about a conduit passing through the wall opening to enable the conduit to pass through the wall at an angle up to and even greater than 30°. Another embodiment of the present invention comprises a flange type riser and base connection involving the location of the entire sealing assembly within a chamber base/riser section.

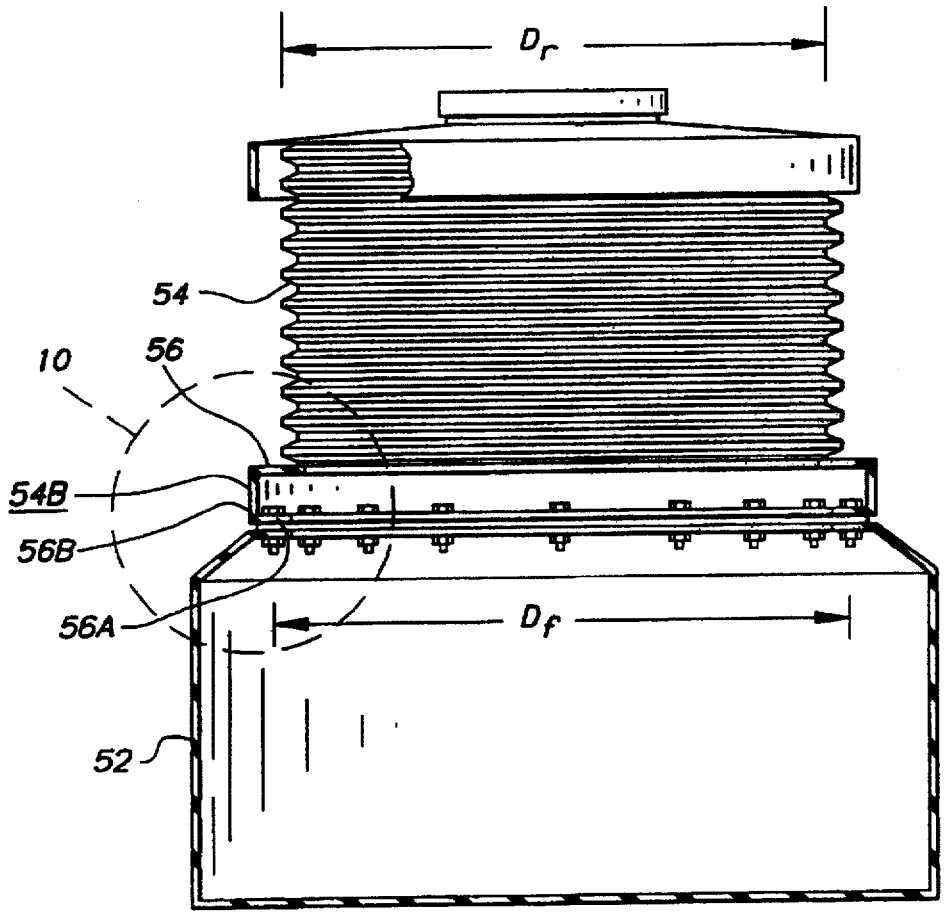

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-7 are now disclaimed.

* * * * *